June 10, 1941.   J. E. PADGETT   2,245,078
DRIVE MECHANISM
Filed Oct. 28, 1938   2 Sheets-Sheet 1

INVENTOR.
JOSEPH E. PADGETT
BY Lawrence C. Witker
ATTORNEY

June 10, 1941.  J. E. PADGETT  2,245,078
DRIVE MECHANISM
Filed Oct. 28, 1938   2 Sheets-Sheet 2
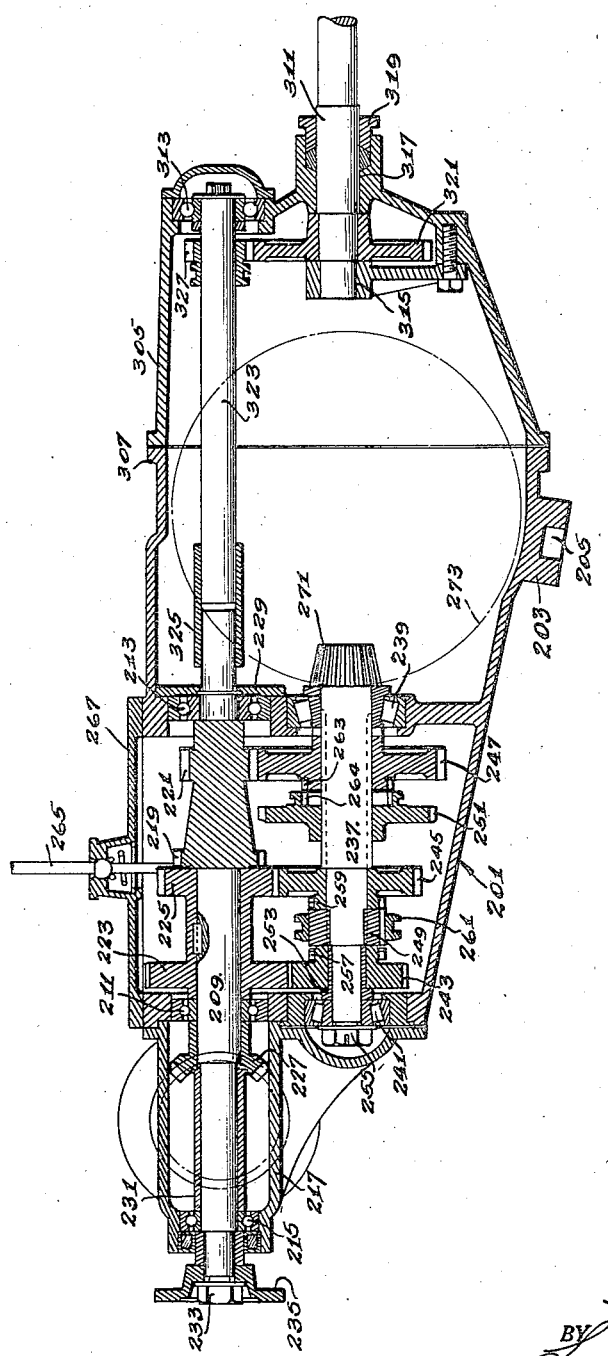
INVENTOR.
JOSEPH E. PADGETT
BY Lawrence C. Witke
ATTORNEY Patented June 10, 1941

2,245,078

UNITED STATES PATENT OFFICE 2,245,078

DRIVE MECHANISM

Joseph E. Padgett, Toledo, Ohio

Application October 28, 1938, Serial No. 237,457

1 Claim. (Cl. 74—607)

This invention relates to automotive vehicles and is more particularly directed to improved drive or power transmission mechanisms for such vehicles.

An object of the invention is to provide a novel drive mechanism in which the transmission and differential are enclosed in a compact casing structure supported adjacent the driving wheels, and spaced from the power plant which is connected thereto by means of a propeller shaft.

Another object of the invention is to provide an improved unitary transmission and differential assembly for use in a drive mechanism of this type which is wholly contained in an integral casing of minimum size and adapted to be readily removable for repair or replacement.

A further object of the invention is to provide an improved casing structure in which the supporting surfaces or seats of the several bearings used to mount the input shafts, the combined countershaft and pinion shaft and the differential carrier, are all formed directly on the casing walls, thereby facilitating manufacture and providing a stronger, yet lighter and improved assembly.

A still further object of the invention is to provide a novel and improved transmission differential unit wherein the power input shaft of the transmission is extended beyond the differential for use as a power take-off shaft.

A further object of the invention is to provide a transmission differential unit for a vehicle in which a separate power take-off shaft is arranged substantially in line with the axis of the differential ring gear, the take-off shaft being selectively operable from the primary transmission shaft.

Further objects and advantages of the invention will become apparent from a study of the following description taken in connection with the accompanying drawings, in which:

Figure 3 is a view similar to Figure 1, illustrating another form of the invention.

Figure 1:
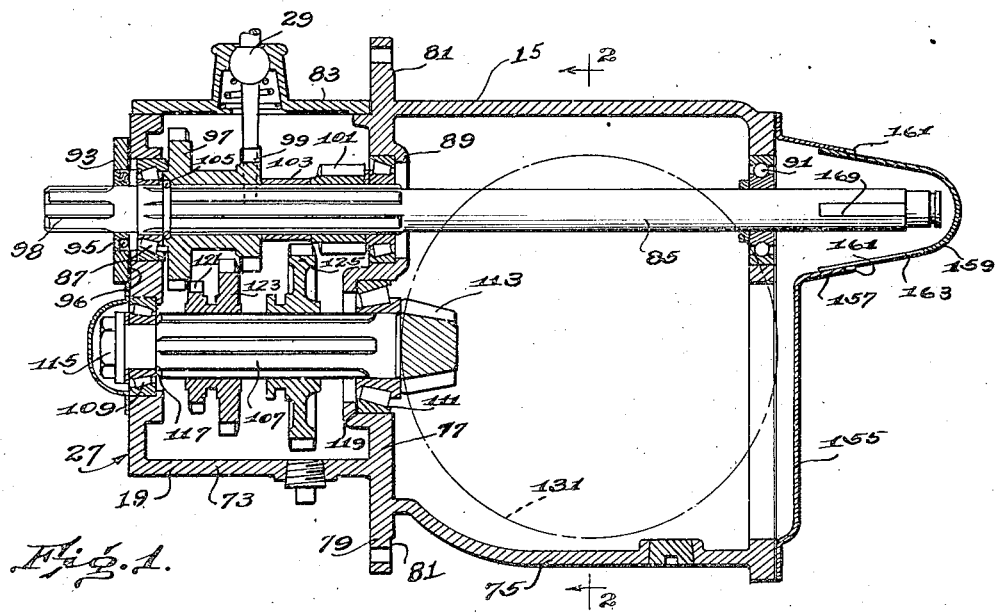
Figure 1 is a longitudinal vertical sectional view of a form of the invention.

With reference to the drawings, wherein like reference characters are used to designate the same parts wherever they occur throughout the several views, an axle drive assembly has been illustrated as comprising a casing portion 15 preferably formed as a metal casting having integral oppositely extending projections 17 and 18 and an integral extension 19 projecting in angular relation. The assembly also includes change speed gearing and differential mechanism, the latter being driven by a unitary countershaft and pinion shaft within the unitary casing, and the casing being formed with interior bearing seats for supporting suitable bearings which cooperate to absorb end thrust and radial loads.

The projections 17 and 18 are constructed so as to form mounts for axle tubes 21 and 22 which extend outwardly from the casing 15, the outer extremities of the tubes serving to locate the usual wheel structures. When desired, the projections 17 and 18 may be projected or extended outwardly to the wheels, in which instance the tubes 21 and 22 may be eliminated. The axle tubes when utilized may be secured in the projections in any suitable manner as by welding or riveting and likewise the tubes or the projections may be of any desired length depending upon the type of vehicle with which the structure is used.

A propeller shaft, (not shown) is preferably connected between a suitable source of power and the input end of the unitary transmission and differential mechanism 27. Suitable shifting mechanism is mounted adjacent the change speed gearing of unit 27, and may be in the form of a conventional shifting lever or by remotely controlled automatic shifting means, depending upon the type of vehicle with which the invention is utilized.

Figure 2:
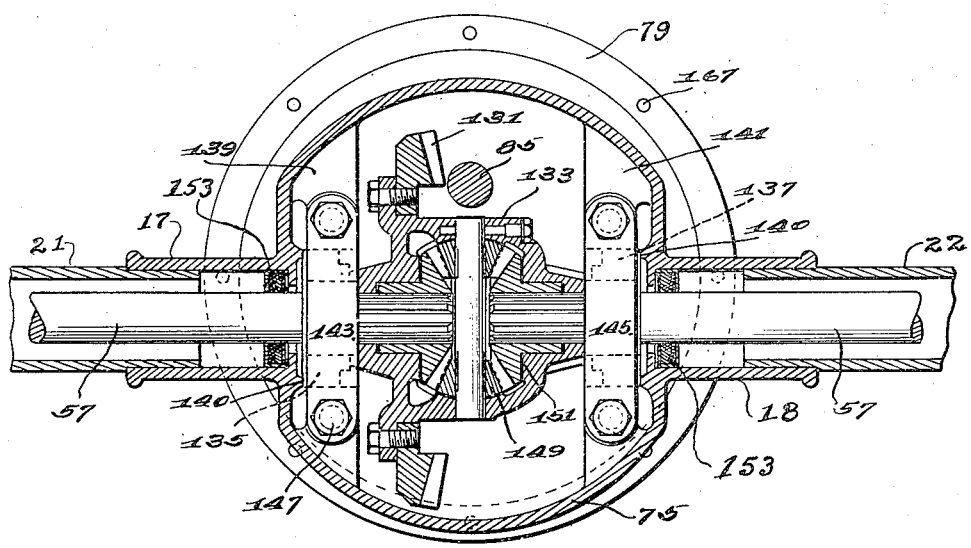
Figure 2 is a vertical sectional view taken substantially on a line 2—2 of Figure 1.

Referring now to the form of the invention shown in Figures 1 and 2, the power transmission unit 27 comprises the integral casing structure 15 having front and rear sections 73 and 75 separated by wall 77. In some installations a flange 79 may be provided which surrounds the unit 27 and is provided with a locating and supporting surface 81 adapted to be bolted to a casing or other supporting element (not shown). Cover 83 closes an opening in the top of section 73 and may be provided with a gear shift lever 29, in the manner shown.

Shaft 85 is journaled in the casing on bearings 87, 89 and 91, with cap 93, under which are adjusting shims 96, serving to hold bearings 87—89 and shaft 85 in assembled position. Sealing means 95 prevents the escape of lubricant from the casing through cap 93. Gears 97, 99 and 101 are splined on shaft 85, spacing ring 103 and snap ring 105 serving to position these gears axially on shaft 85. Shaft 85 is splined at 98 to receive a universal joint of the propeller shaft.

Directly below, and parallel to, shaft 85 is a second splined shaft 107, journaled in bearings 109 and 111. Gear 113 is formed integrally with shaft 107 and nut 115 holds the outer races of bearings 109, 111 against shoulders in the casing, shims 117 and 119 being employed to adjust the bearing clearances. Slidably mounted on the splined shaft 107 are three gears 121, 123 and 125 which are adapted to be selectively meshed with gears 97, 99 and 101 by a shifting mechanism, not shown, under the control of shifting lever 29. The gear 125 is also adapted to mesh with an idler gear, not shown, driven from gear 101, to provide a reverse drive. Thus gear 113 may be driven from shaft 85 at any one of several, three forward and one reverse, speeds in an obvious manner.

Bevel ring gear 131, shown in broken lines in Figure 1, meshes with pinion 113, carried by shaft 107, and is mounted on a differential carrier member 133, journaled in bearings 135, 137. Bearings 135, 137 are mounted in bearing supports 139, 141, formed on the interior of casing section 75, by means of caps 143, 145, held in place by nuts 147. Annular thrust surfaces 149, 149, are formed on the walls of casing 75 to sustain the axial thrusts of bearings 135, 137. Differential pinion gears 149 drive side gears 151, to which are splined the axle shafts or drive axles 57—57. Axles 57—57 extend outwardly from casing 75 through sealing means 153—153.

The rear face of casing portion 75 is closed by cover 155, formed with a projecting portion 157 to which is detachably secured a closure 159 surrounding a projecting end of shaft 85. The projection 157 is tapered, as shown, and the closure 159 is made of resilient material and split, as at 163, so that it may be readily removed or snapped into place with the shoulder 161 abutting the end of projection 157.

The portion 75 of the casing is generally circular, see Figure 2, and when the structure is utilized in a tractor, for example, having a transverse rear housing or supporting structure which carries the final drive, the portion 75 may be secured therein by suitable bolts, passing through the holes 167 to hold the unit 27 in place. When thus assembled the closure 159 projects outwardly, the projecting end of shaft 85, enclosed by closure 159 being formed with keyways 169, so that suitable power take-off devices may be secured thereto when closure 159 is removed.

The unit 27, as will be noted, is integral and by simply sliding the shafts 57—57 out of the unit it may be readily removed for replacement or repair. It will also be observed that as the bearing seats are all formed directly in the casing walls to absorb end thrust and radial loads, the sizes of gears 131, 97, 99, 101, 121, 123 and 125 may be reduced and the overall size of the whole unit correspondingly reduced. Also by extending the shaft 85, see Figure 1, a convenient power take-off, housed by the closure 159 when not in use, is provided.

Turning now to Figure 3, a modified form of unitary power transmission device, incorporating all of the features of the construction just described, but designed to be mounted on a slightly different form of axle element, is disclosed.

In this embodiment of my invention, casing 201 is provided with an integral lug or projection 203, which is recessed at 205 to form an anchorage for a drawbar, or similar device, used to attach implements pulled behind a tractor, for example, when the invention is used in such a vehicle. Shaft 209 is journaled in casing 201 by bearings 211, 213, and 215, the latter bearing being carried by a projecting portion 217. Gears 219 and 221 are formed integrally with shaft 209 while gears 223, 225 and keyed thereon. Gear 227 is also keyed to shaft 209. Bearing cap 229 holds bearing 213 in the housing 201, while spacing sleeve 231, interposed between gear 227 and a power receiving element 235, transmits the thrust of a clamping nut 233 throughout the whole assembly. Gear 227 drives a conventional power pulley, not shown.

Shaft 237, arranged below and parallel to shaft 209, is journaled in bearings 239 and 241. Rotatably mounted on shaft 237 are gears 243, 245 and 247, while splined thereto is a clutch element 249 and gear 251. Gear 243 is mounted on a bushing element 253 and a nut 255 thrusts the inner race of bearing 241 against the bushing 253 and also serves to hold bearings 241 and 239, as well as shaft 237, in assembled position.

Gears 243 and 245 are provided with sets of clutch teeth 257 and 259, respectively, and a sliding clutch element 261 is mounted on clutch element 249 for engagement with either of the sets of teeth 257 and 259. Gear 247 is provided with external clutch teeth 263 arranged to cooperate with internal teeth 264, carried by the gear 251.

By means of a shifting mechanism, not shown, controlled by the lever 265, mounted in cover 267, anyone of the gears 243, 245 or 247, which constantly mesh with gears 221, 223 or 225, may be drivingly connected to shaft 237. Also by sliding gear 251 to the left, from its position shown in Figure 3, it may be meshed with an idler gear, not shown, driven by gear 219, to give a reverse drive. This type of variable speed transmission is well known in the art, and further description thereof is, therefore, deemed unnecessary.

In this modification, a slightly different form of power take-off is provided by extending shaft 209 a short distance beyond the bearing 213. A removable end portion 305 is secured to flange 307 by bolts passing through suitable openings and carries shaft 311 and bearings 313. Shaft 311 is journaled in bearings 315, 317, the latter of which is sealed by a stuffing box 319, and carries a gear 321. A shaft 323 is journaled at one end in bearing 313 and connected by coupling 325 to the extending portion of shaft 209. Splined to shaft 323 is a slideable gear 327, adapted to be selectively meshed with gear 321 by a shifting means not shown. Thus the shaft 311 provides a power take-off which may be selectively driven at any time when the vehicle engine is running and the clutch is engaged.

A comparison of the two embodiments above described shows that my improved unitary power transmission unit may be designed to cooperate with different types of rear axle elements in a very flexible manner, it being only necessary to slightly modify the construction of the casing. It will also be seen that when my improved unit is associated with the driving axle element of a vehicle with the differential mechanism directly over the center-line of the axle element, a considerable space is left back of the engine clutch and between it and the front of the power transmission unit. Due to the compactness of my improved units, no material lengthening of the usual frame structure is required to obtain these results.

In addition it will be observed that in each modification the surfaces for receiving and supporting the several bearings are formed directly on the casing structure. Thus in the modification shown in Figures 1 and 2 the radial supporting surfaces for the differential carrier bearings are machined on the supports 139—141, see Figure 2, while in the modification shown in Figure 3, the corresponding radial supporting surfaces are formed in corresponding supports. In each modification axial thrust surfaces are provided on the casing side-walls, see 143—149 of Figure 2. Likewise the supporting surfaces for bearings 87, 89, 109 and 111, which support the shafts 85 and 107, and also the supporting surfaces for bearings 211, 213, 239 and 241, which support shafts 209 and 237, are machined directly on the casings 15 and 201, respectively.

The foregoing arrangement not only provides an unusually rigid and strong construction but also makes it possible to very accurately locate these bearing supporting surfaces by simple machining operations and insures uniformity in production. The bearing supporting surfaces for the differential carrier bearings may be formed in the manner shown in the patent to Joseph E. Padgett and Robert P. Lewis, Reissue No. 20,149, granted October 27, 1936, if desired.

When the present invention is incorporated for use in tractors, for example, the housing extensions may be extended to gear trains at the wheels, in which instance reduction gearing is preferably interposed between the ends of the axles and the wheels through which the major part of the speed reduction may be effected. Such an arrangement makes it possible to reduce the size of the bevel ring gear and thus keep the size of the unit down to the desired minimum.

Also in both embodiments, the unit may be easily removed from the tractor for repair or replacement. This is of considerable importance as vehicles of this type are subjected to unusually severe operating conditions under the care of unskilled persons.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In a unitary power transmission device, an integral casing, a transverse inner wall dividing the casing into front and rear compartments, said rear compartment having an open end, an axle tube mount integral with and extending from each side of said rear compartment, a closure for the open end of said rear compartment, and a mounting flange for said casing forming a radial extension of said inner wall.

JOSEPH E. PADGETT.